(12) United States Patent
Morris et al.

(10) Patent No.: US 9,052,462 B2
(45) Date of Patent: Jun. 9, 2015

(54) AREA ARRAY WAVEGUIDE POWER SPLITTER

(75) Inventors: Terrel Morris, Garland, TX (US); Michael Renne Ty Tan, Menlo Park, CA (US); Wayne V Sorin, Mountain View, CA (US); Paul Kessler Rosenberg, Sunnyvale, CA (US); Sagi Varghese Mathai, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 233 days.

(21) Appl. No.: 13/698,933

(22) PCT Filed: May 28, 2010

(86) PCT No.: PCT/US2010/036538
§ 371 (c)(1),
(2), (4) Date: Nov. 19, 2012

(87) PCT Pub. No.: WO2011/149474
PCT Pub. Date: Dec. 1, 2011

(65) Prior Publication Data
US 2013/0064505 A1    Mar. 14, 2013

(51) Int. Cl.
*G02B 6/26* (2006.01)
*G02B 6/28* (2006.01)
*G02B 6/42* (2006.01)
*G02B 6/12* (2006.01)
*G02B 6/136* (2006.01)

(52) U.S. Cl.
CPC .... *G02B 6/2808* (2013.01); *G02B 2006/12154* (2013.01); *G02B 6/136* (2013.01); *G02B 6/2813* (2013.01)

(58) Field of Classification Search
CPC ...... G02B 6/28; G02B 6/2804; G02B 6/2808; G02B 6/2813; G02B 6/136; G02B 2006/12154
See application file for complete search history.

(56) References Cited

U.S. PATENT DOCUMENTS

| | | | |
|---|---|---|---|
| 3,806,223 A | | 4/1974 | Keck et al. |
| 4,240,849 A | * | 12/1980 | Kurokawa et al. ........... 156/73.2 |
| 4,995,686 A | | 2/1991 | Blonder et al. |
| 5,185,824 A | * | 2/1993 | Grimes et al. .................. 385/19 |
| 5,311,604 A | * | 5/1994 | Rogner et al. .................. 385/14 |
| 5,716,741 A | * | 2/1998 | Reinecke et al. .................. 430/8 |

(Continued)

FOREIGN PATENT DOCUMENTS

| | | |
|---|---|---|
| EP | 0013972 | 8/1980 |
| JP | 2002-333537 | 11/2002 |
| JP | 2006-276081 | 10/2006 |

OTHER PUBLICATIONS

PCT Search Report, PCT/US2010/036538, Hewlett-Packard Development Company, LP, Report dated Feb. 1, 2011.

*Primary Examiner* — Rhonda Peace
(74) *Attorney, Agent, or Firm* — Hewlett-Packard Patent Department (57) ABSTRACT

A method for constructing an area array waveguide power splitter includes preparing a reflective layer on a substrate and forming a core of an area array waveguide layer and alignment features for an optical fiber input and a plurality of optical fiber outputs atop the reflective layer, wherein the core of the area array waveguide layer and the alignment features are formed concurrently. The method also includes applying a reflective layer to the top and side surfaces of the core of the area array waveguide layer and exposing an input and exposing a plurality of outputs in the reflective layer.

13 Claims, 5 Drawing Sheets

(56) References Cited

U.S. PATENT DOCUMENTS

| | | | |
|---|---|---|---|
| 6,366,730 B1* | 4/2002 | Cappuzzo et al. | 385/129 |
| 6,996,302 B2* | 2/2006 | Hamada | 385/14 |
| 7,054,523 B2* | 5/2006 | Takahashi et al. | 385/28 |
| 7,929,814 B2* | 4/2011 | Gothoskar et al. | 385/14 |
| 8,532,447 B1* | 9/2013 | Kwakernaak et al. | 385/31 |
| 8,721,192 B2* | 5/2014 | Miyadera et al. | 385/91 |
| 2002/0162951 A1* | 11/2002 | Yamada et al. | 250/227.11 |
| 2003/0077061 A1* | 4/2003 | Sugama et al. | 385/134 |
| 2004/0062506 A1* | 4/2004 | Komura et al. | 385/131 |
| 2004/0105677 A1* | 6/2004 | Hamada | 398/79 |
| 2004/0258347 A1* | 12/2004 | Gothoskar et al. | 385/14 |
| 2005/0074203 A1* | 4/2005 | Marion | 385/24 |
| 2005/0244123 A1* | 11/2005 | Hirao et al. | 385/129 |
| 2010/0054675 A1 | 3/2010 | Benjamin et al. | |
| 2013/0064505 A1* | 3/2013 | Morris et al. | 385/45 |
| 2013/0094801 A1* | 4/2013 | Morris | 385/14 |

* cited by examiner

AREA ARRAY WAVEGUIDE POWER SPLITTER

BACKGROUND

A power splitter is a device that distributes power from an input to two or more outputs. In many applications, there is a desire for the input power to be distributed evenly among the two or more outputs. Power splitters exist in configurations in which power from an input is split between two outputs, an input and four outputs, an input and eight outputs, and so forth. As is the case with many electronic components and devices including power splitters, there is a constant need to reduce the size and the cost of the splitter white maintaining performance.

DESCRIPTION OF THE EMBODIMENTS

Embodiments of the invention provide the capability to distribute input power evenly between two or more outputs. Other embodiments of the invention can be used to distribute power between at least one input and a large number of outputs, such as 8, 16, 32, and so forth. In each instance, the fundamental area array waveguide power splitter topology can be mass produced at relatively low cost and packaged within an envelope on the order of 1 cm$^3$.

Figure 1:
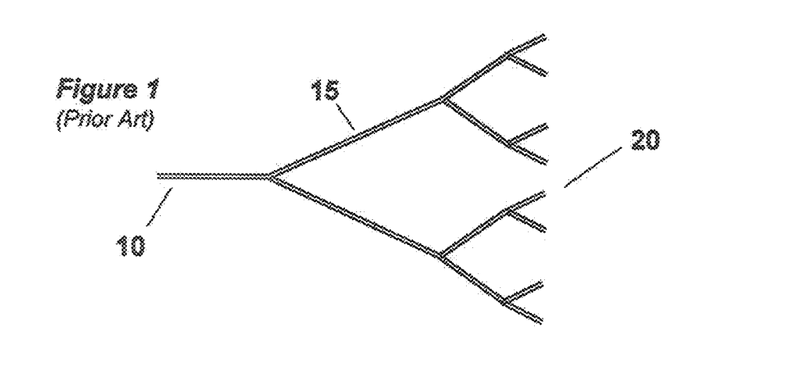
FIG. 1 shows a 1:8 power splitter topology in accordance with the prior art.

FIG. 1 shows a 1:8 power splitter topology in accordance with the prior art. In FIG. 1, power splitter 15 consists of glass or plastic optical fibers that have been melted or otherwise liquefied and joined to form a series of "Y" connections. In FIG. 1, power coupled to a single input 10 is split among each branch of outputs 20. Although FIG. 1 shows an eight-way split, the basic "Y" connection can be used to split power from an input to any number of 2$^n$ outputs, with "n" being any whole number.

The inventors have determined that splitter topologies such as that shown in FIG. 1 can exhibit undesirable performance characteristics. For example, the Y-branch splitter of the Figure may pass certain modes (such as transverse electric, transverse magnetic, transverse electro-magnetic, and hybrids) more effectively in some branches of the splitter than in others. The unequal propagation of certain modes can bring about mode-dependent power variations at outputs 20. These inconsistencies can cause power splitter topples such as that of FIG. 1 to be unsuitable for some applications.

Figure 2:
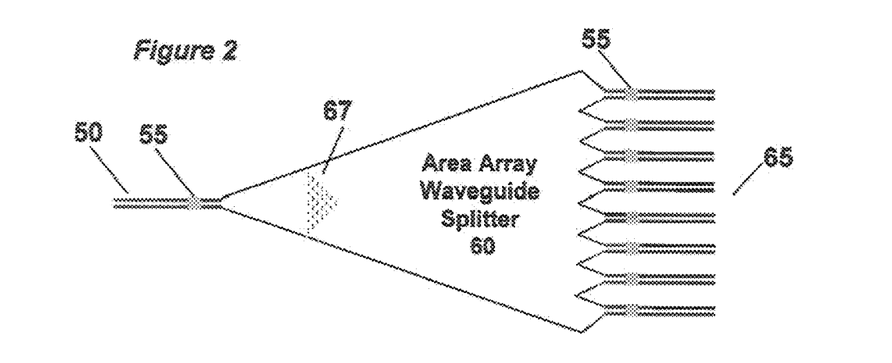
FIGS. 2-3 are top and side views showing the basic components of an area array waveguide splitter according to an embodiment of the invention.

FIG. 2 shows the basic components of an area array waveguide splitter according to an embodiment of the invention. In FIG. 2, optical fiber input 50 is coupled to area array waveguide splitter 60 through index-matching material 55 that serves to reduce the insertion loss and light leakage at the interface of optical fiber input 50 with the input to splitter 60. At the output of splitter 60, index-matching material 55 is also used to reduce the light leakage at the interface of the outputs of splitter 60 with optical fiber outputs 65. It should be noted that optical fiber input 50 and optical fiber outputs 65 may be single-mode fibers, which might be on the order of 5-10 microns in diameter and constructed of materials having a suitable index of refraction for propagating single modes along the fiber, or may be multi-mode fibers, which might be on the order of 50 to 100 microns in diameter and constructed of materials having a suitable index of refraction for propagating multiple modes along the fiber.

Area array waveguide splitter 60 is shown in FIG. 2 to be substantially triangular in shape and substantially planar with a height measured in millimeters. The inventors contemplate that in embodiments of the invention, splitter 60 employs a core material consisting of a polymer plastic, glass, polycarbonate, or other suitable material, with a reflective surface sitting atop and to the sides of the core material. In one embodiment of the invention, the reflective surface includes a material having a much lower index of refraction than the core material. In this instance, any stray light striking the interface between the core and the reflective surface undergoes total internal reflection, thus virtually eliminating leakage conveyed into splitter 60 by way of optical fiber input 50. In other embodiments of the invention, a cladding or metal layer, metalized glass, metal clad glass, or other reflective surface may be used to minimize any light leakage conveyed into splitter 60 by way of optical fiber input 50.

At the output section of area array waveguide splitter 60, triangular-shaped tapered horns serve to funnel energy from the splitter to each of optical fiber outputs 65. In the embodiment of FIG. 2, each tapered horn receives approximately ⅛ of the energy coupled into splitter 60 by way of optical fiber input 50. In other embodiments of the invention, each of the tapered horns may be curved or shaped differently so that scattering brought about by the vertex of each tapered horn can be minimized. Additionally, based on experiment or analysis, it may be advantageous for some of the triangular-shaped horns of FIG. 2 to be larger than others in order to provide equal power distribution among each output. Further, experiment or analysis may indicate that the inclusion of scattering area 87 may be used to homogenize or otherwise make uniform the distribution of light coupled into splitter 60 through optical fiber input 55.

It should also be noted that the use of a metalized substrate and metalized layers to surround the core of area array waveguide splitter 60 to provide containment of the light coupled to splitter 60 can also provide a beneficial mechanical constraint to the thermal expansion of the core material of splitter 60. In one embodiment, in which a polymer having a coefficient of thermal expansion of 70 ppm per degree Celsius is used to form the core of splitter 60, the use of a metal layer that employs a metal having a coefficient of thermal expansion of 17-18 ppm per degree Celsius acts as a barrier that limits the thermal expansion of the core material of the area array waveguide splitter.

Figure 3:
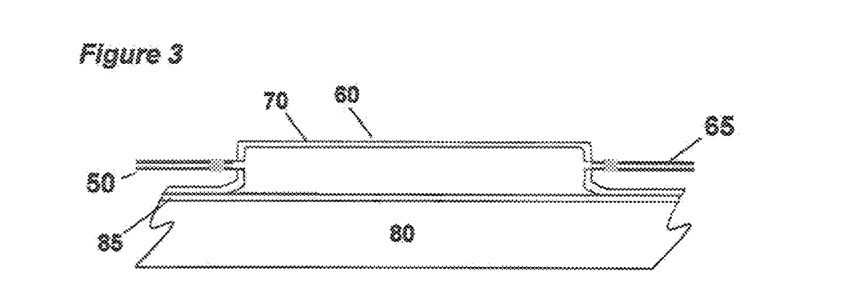

FIG. 3 shows an area array waveguide splitter along with other features according to an embodiment of the invention. In FIG. 3, a core of area array waveguide splitter 60 sits atop substrate 80, which is contemplated as consisting entirely of metal, or may be made of glass or other rigid material and coated with a metalized or other reflective material such as foil or aluminized mylar such as shown by reflective layer 85. At the sides and to the top of the core of splitter 60 is metal layer 70, which also provides a reflective surface towards the interior of the splitter. Thus, in this embodiment, the core of splitter 60 is substantially surrounded by reflective surfaces in a manner that provides containment of the optical energy at all locations other that the points at which input optical fiber 50 and optical fiber outputs 65 couple optical energy into and out of the splitter. In FIG. 3, width of the output end of splitter 60 is contemplated as being at least 10 times the height of the splitter.

In another embodiment of the invention, the core of area array waveguide splitter 60 of FIG. 3 may be substantially surrounded by a refractive material so as to bring about total internal reflection within the splitter. As known to those of skill in the art, in the event that the surrounding material possesses an index of refraction that is lower than the index of refraction for the core material of the splitter, optical energy that strikes the interface of the core materiel and the surrounding material will be completely reflected inward, away from the surrounding material. The well-known relationship $\theta_c = \arcsin(n_2/n_1)$ determines the critical angle at which total internal reflection occurs as a function of the index of refraction of the core material of area array waveguide splitter ($n_1$) and the index of refraction of the surrounding material ($n_2$).

Figure 4:
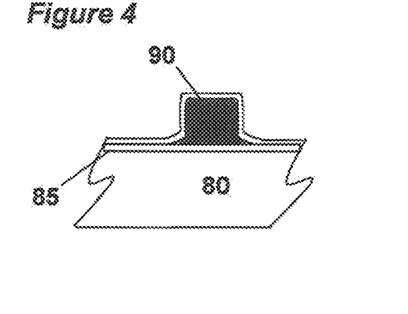
FIG. 4 is a cross-sectional view of a waveguide atop a substrate according to an embodiment of the invention.

FIG. 4 is a cross-sectional view of a waveguide atop a substrate according to an embodiment of the invention. Waveguide 90, which may be constructed from a polymer plastic, glass, polycarbonate, or other suitable material, is shown as being encased in a reflective material to the top and sides as well as being in contact with reflective layer 85 of substrate 80 so as to reduce any light leakage from the top and sides of the waveguide. In FIG. 4, the direction of propagation of the signal within waveguide 90 is into or out of the page.

Figure 5:
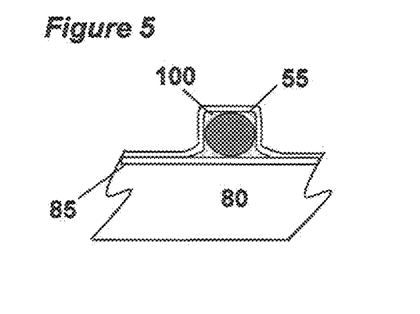
FIG. 5 is an end view of a plastic optical fiber mated to a waveguide according to an embodiment of the invention.

FIG. 5 is an end view of a plastic optical fiber mated to waveguide according to an embodiment of the invention. In FIG. 6, plastic optical fiber 100 is surrounded by index-matching material 55 and substantially surrounded by reflective materials at the top, bottom, and sides. As in FIGS. 3 and 4, substrate 80 is contemplated as consisting entirely of metal or may be made of glass or other rigid material and coated with a metalized or other reflective or refractive material such as foil or aluminized mylar such as shown by reflective layer 85.

Figure 6:
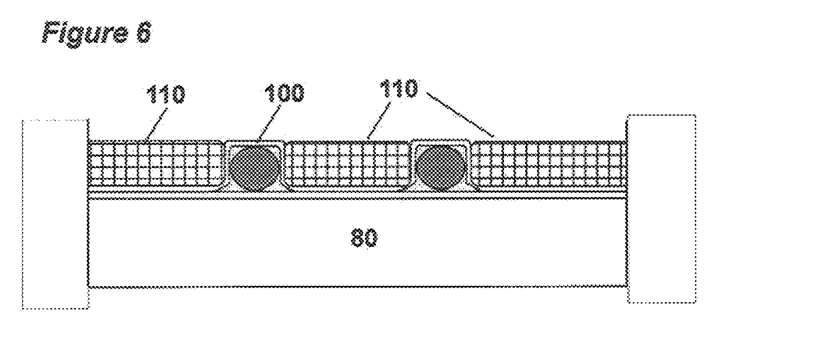
FIG. 6 is a cross-sectional view of a pair of plastic optical fibers held captive by alignment features according to an embodiment of the invention.

FIG. 6 is a cross-sectional view of a pair of plastic optical fibers affixed to a reflective surface of a substrate according to an embodiment of the invention. It is contemplated that alignment features 110 are formed during the manufacturing step at which the core of an area array waveguide is created. As will be described with reference to FIG. 7, precise alignment between optical fibers 100 and a corresponding pair of waveguides (such as waveguide 90 of FIG. 4) can be assured through the use of alignment features 110.

Figure 7:
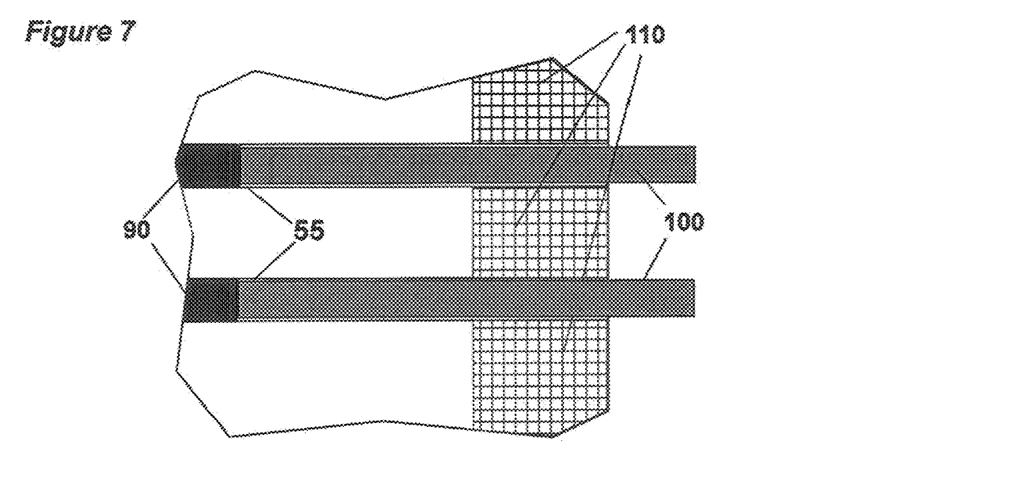
FIG. 7 is a top view of a pair of raised polymer waveguides interfacing with plastic optical fibers according to an embodiment of the invention.

FIG. 7 is a top view of a pair of raised polymer waveguides interfacing with plastic optical fibers according to an embodiment of the invention. In FIG. 7, raised polymer waveguides 90 are coupled directly to an area array waveguide splitter such, as area array waveguide splitter 60 of FIGS. 2 and 3. In this embodiment, raised polymer waveguides 90 interface with plastic optical fibers 100 through index-matching material 55 that serves to reduce the loss brought about by coupling the waveguides to the optical fibers. FIG. 7 also shows alignment features 110 which serve to constrain the movement of plastic optical fibers 100.

Figure 8:
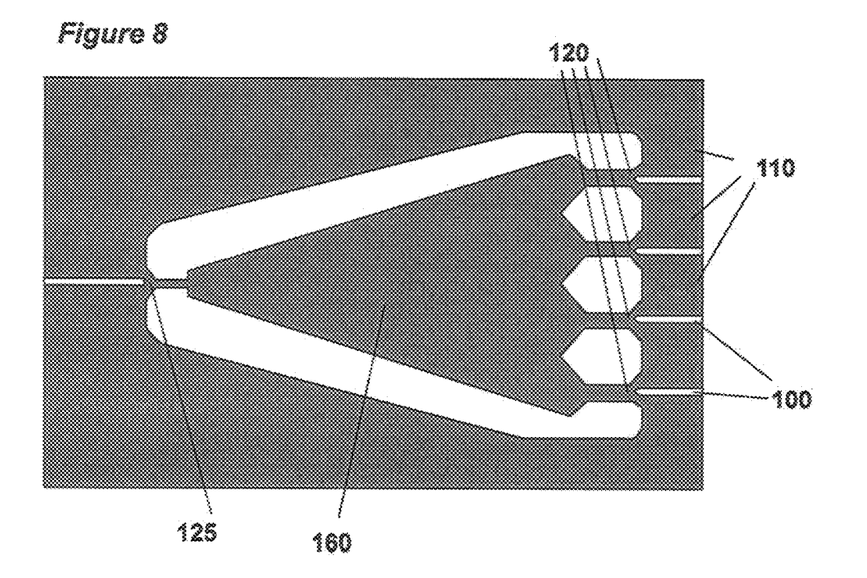
FIG. 8 shows a top view of an area array waveguide during manufacturing according to an embodiment of the invention.

FIG. 8 shows a top view of an area array waveguide splitter during manufacturing according to an embodiment of the invention. The shaded area represents polymer such as that used to form area array waveguide splitter 60 of FIG. 2. In FIG. 8, energy is coupled to splitter 160 by way of a single input. Splitter 160 also includes four outputs at an opposite end. In between each output and between each output and an edge of the splitter, alignment features 110 constrain the movement of each of plastic optical fibers 100. (For the sake of clarity, only a few of alignment features 110 are identified along with a pair of plastic optical fibers 100.)

In the embodiment of FIG. 8, the inventors contemplate that splitter 160 is formed by way of injection molding in which a core material is injected near the center of splitter 160 by way or one or more sprues and forced to flow outward towards the edges of the mold, thus forming each of alignment features 110 and the waveguide core in a single manufacturing step. In this embodiment, the core material flows from the center through each of bridges 120 (at the output of the splitter) and through bridge 125 (at the input to the splitter). In other embodiments, in which splitter 160 is formed by drawing the core material inward towards the center of splitter 160, bridges 120 and 125 permit the flow of the core material from the alignment features inward. In this embodiment, alignment features 110 as well as the core area array waveguide splitter 160 are formed during a single manufacturing step.

Figure 9:
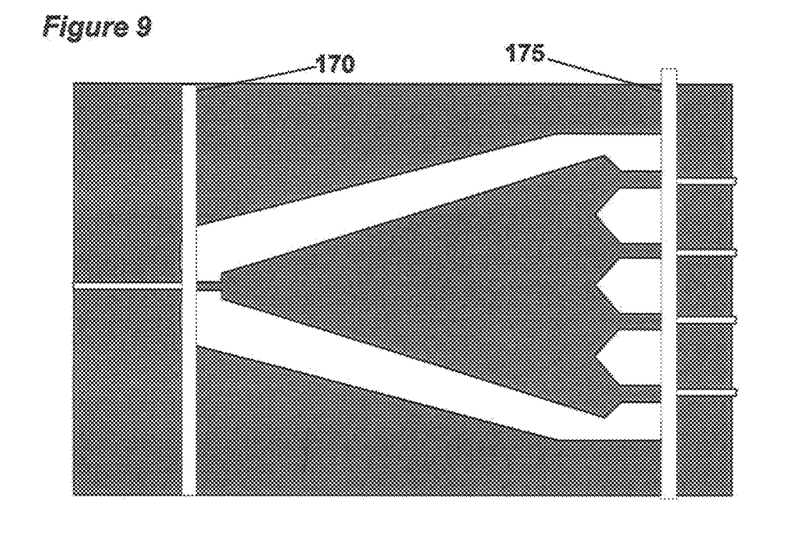
FIG. 9 shows the area array waveguide splitter of FIG. 8 with two cut-lines according to an embodiment of the invention.

FIG. 9 shows the area array waveguide splitter of FIG. 8 with two cut lines according to an embodiment of the invention, in FIG. 9, vertical cut 170 is made by way of a cut, cut-and-polish, ablation, or other material-removal process that removes bridge 125 at the input to the waveguide splitter. At the output, vertical cut 175 removes each of bridges 120. Thus, vertical cuts 170 and 175 create two channels that cross the path of the bridges formed earlier in the manufacture of splitter 160. In the embodiment of FIG. 9, vertical cuts 170 and 175 do not pass through the substrate (such as substrate 80 of the figures previously described herein). Consequently, the alignment features remain in place after the cuts.

In some embodiments of the invention, a polishing step may be performed after performing vertical cuts 170 and 175. In other embodiments of the invention, additional polishing after performing vertical outs 170 and 175 may not be desirable. In these instances, the natural roughness of the removal process that forms vertical cuts 170 and 175 may create a diffuse surface at the input and output of splitter 160 that serves to reduce differences in light propagation modes.

Figure 10:
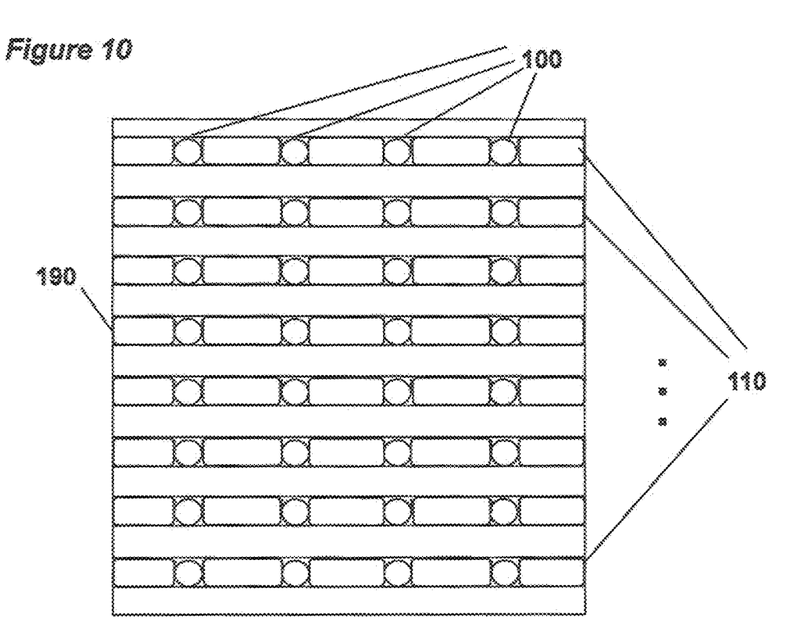
FIG. 10 shows a stacked arrangement of area array waveguide splitters according to an embodiment of the invention.

FIG. 10 shows a stacked arrangement of area array waveguide splitters according to an embodiment of the invention. In FIG. 10, eight area array waveguide splitters (190), each having a single input and four outputs are stacked. Not shown in FIG. 10 is a single input that feeds each of the four outputs shown in each layer of FIG. 10. In each of the waveguide splitters of FIG. 10, at least some of alignment features 110 are shown. The Figure also shows and exemplary number of plastic optical fibers 100, each of which is constrained by alignment features 110.

It should be pointed out that any number of area array waveguide sputters 190 can be stacked atop one another. In the embodiment of FIG. 10, 8 such splitters are stacked. However, other embodiments may include fewer than 8 (such as 2, 4, or 8) or a number larger than 8, such as 16, 32 and so forth. Additionally, although each splitter is shown as having only four outputs, eight-way splitters, 16-way splitters, and so forth are also possible.

Figure 11:
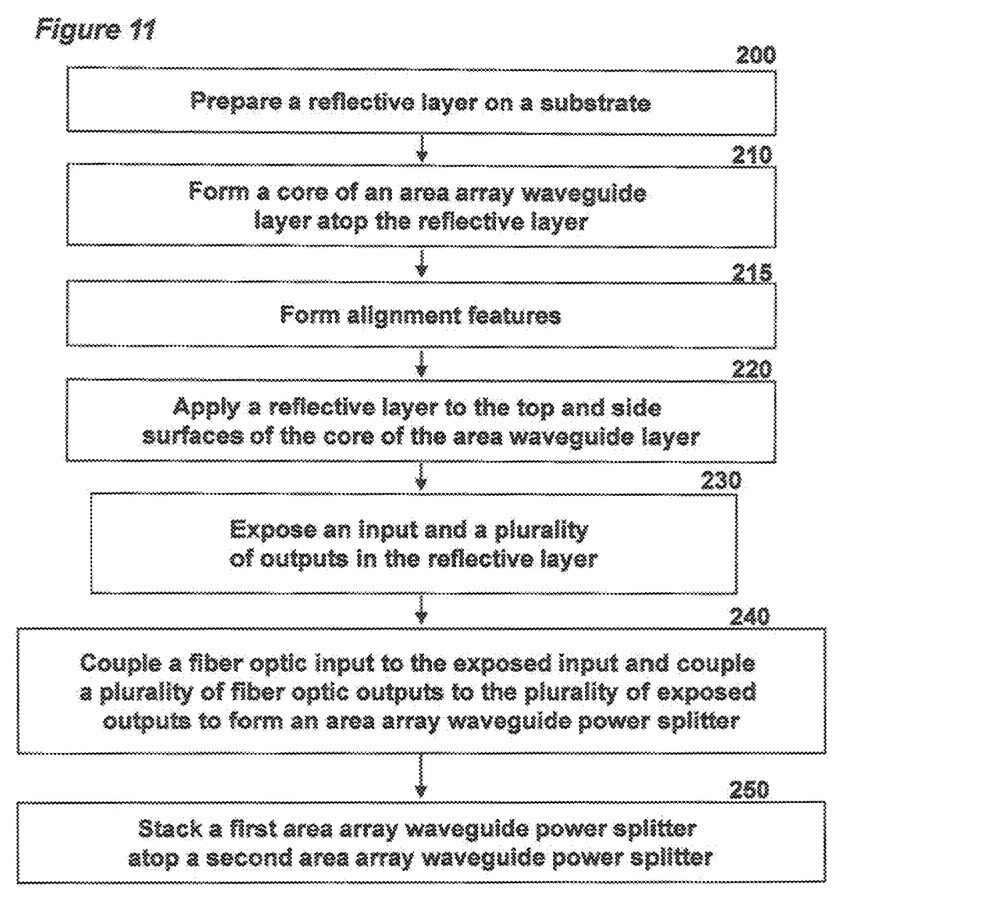
FIG. 11 is a flow chart for a method of constructing an area array waveguide splitter according to an embodiment of the invention.

FIG. 11 is a flow chart for a method of constructing an area array waveguide splitter according to an embodiment of the invention. At step 200, a reflective layer on a substrate is prepared. The preparing step may include applying a reflective layer to a nonmetallic substrate such as foil, aluminized Mylar, and so forth, or may include polishing a substrate that consists entirely of metal in other embodiments of the invention, the substrate may be made of glass or other rigid material and coated with a metalized or other reflective material. The method continues at step 210, at which a core of an area array waveguide layer is formed atop the reflective layer. As mentioned previously, the core of the waveguide layer may be constructed of a polymer plastic, glass, polycarbonate, or other suitable material. At step 215, the alignment features for an optical fiber input and a plurality of optical fiber outputs are formed atop the reflective layer. In many embodiments of the invention, step 215 is performed concurrently with step 210. Steps 210 and 215 may be accomplished by way of injection molding, compressive thermal forming, and compressive ultrasonic forming.

The method continues at step 220, at which a reflective layer is applied to the top and side surfaces of the core of the area array waveguide layer. As mentioned previously herein, the reflective layer provides containment of the optical energy at all locations other that the areas at which the optical fiber input and optical fiber outputs couple signals into and out of the splitter. Step 220 may include surrounding the core of area array waveguide layer (at the sides and top) with a material having an index of refraction that is less than the material used to form the core of the waveguide. In other embodiments, step 220 may include spraying a metal material onto the top and side surfaces of the core of the area array waveguide layer, immersing the core of the area array waveguide layer in a solution, or sputtering a metal cladding onto the core of the area array waveguide layer. The method continues at step 230, which includes exposing an input and a plurality of outputs to the area array waveguide, in one embodiment of the invention, step 230 includes removing material at a bridge that separates the alignment features for the input and output optical fibers and the area array waveguide. At step 240, the input and output optical fibers are coupled to the exposed input and outputs to form an area array waveguide power splitter. In some embodiments of the invention, step 240 may also include applying index-matching material to input and output optical fibers.

In an embodiment of the invention that makes possible the stacked arrangement of area array waveguide splitters shown in FIG. 10, step 250 of FIG. 11 may also be performed. At step 250, a first area array waveguide power splitter, perhaps as manufactured by way of steps 200, 210, 215, 220, 230, and 240, is stacked atop a second area array waveguide power splitter. The method may continue with stacking a 3rd, 4th, 5th (and so forth) area array waveguide power splitter so as to bring about the embodiment of FIG. 10.

It should be noted that although embodiments of the invention have described coupling to area array waveguide splitters using optical fibers, nothing prevents the use of optical lasers abutted or focused directly at an input to the splitter. Thus, in FIG. 2, for example, optical fiber input 50 could represent a laser beam that couples energy into area array waveguide splitter 60. In such an embodiment, index matching material 55 at the input to splitter 60 may not be required.

In conclusion, while the present invention has been particularly shown and described with reference to various embodiments, those skilled in the art will understand that many variations may be made therein without departing from the spirit and scope of the invention as defined in the following claims. This description of the invention should be understood to include the novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring nor excluding two or more such elements.

What is claimed is:

1. A method for constructing an area array waveguide power splitter, the method comprising:
   preparing a first reflective layer on a substrate;
   forming a core of an area array waveguide layer and alignment features for an optical fiber input and a plurality of optical fiber outputs atop the first reflective layer, the core of the area array waveguide layer and the alignment features being formed concurrently;
   applying a second reflective layer to the top and side surfaces of the core of the area array waveguide layer; and
   exposing an input and exposing a plurality of outputs in the second reflective layer,
   wherein the area array waveguide layer formed atop the reflective layer is approximately triangular in shape, wherein an output portion of the area array waveguide layer has a width of at least 10 times the height of the area array waveguide layer.

2. The method of claim 1, further comprising coupling a single mode optical fiber to the exposed input and coupling a plurality of single mode optical fibers to the plurality of exposed outputs.

3. The method of claim 2, further comprising stacking a first area array waveguide power splitter on to a second area array waveguide power splitter.

4. The method of claim 1, wherein the exposing step includes removing at least a portion of a bridge area that lies between the area array waveguide layer and the alignment features.

5. The method of claim 1, wherein the forming step is accomplished using one of the group consisting of: injection molding, compressive thermal forming, and compressive ultrasonic forming.

6. The method of claim 5, wherein the core of the area array waveguide layer is formed using a material selected from the group consisting of: glass, polycarbonate, and polymer plastic.

7. The method of claim 1, wherein the step of applying a reflective layer to top and side surfaces of the core of the area array waveguide layer includes one of the group consisting of: coating the core of the area array waveguide layer with a material having a substantially different index of refraction than an index of refraction of a core of the area array waveguide layer, spraying a metal material onto the top and side surfaces of the core of the area array waveguide layer, immersing the core of the area array waveguide layer in a solution, and sputtering a metal cladding onto the core of the area array waveguide layer.

8. The method of claim 1 further comprising coupling an input optical fiber to the exposed input and coupling a plurality of output optical fibers to the plurality of exposed outputs of the reflective layer.

9. A stacked area array waveguide power splitter, comprising:
- a first core of an area array waveguide layer disposed on a first reflective surface, the first core of the area array waveguide layer being coated on top and side surfaces with a reflective layer except at locations for coupling energy to a first input and at locations for coupling energy from a first plurality of outputs; and
- a second core of an area array waveguide layer disposed on a second reflective surface, the second core of the area array waveguide layer being coated on top and side surfaces with a reflective layer except at locations for coupling energy to a second input and at locations for coupling energy from a second plurality of outputs,
- wherein the second area array waveguide layer is stacked atop the first area array waveguide layer, and
- wherein the first and second area array waveguide layers are triangular in shape and wherein output portions of the first and second area array waveqduide layers have a width at least 10 times the height of each of the first and second area array waveguide layers.

10. The stacked area array waveguide power splitter of claim 9, further comprising:
first and second alignment features that each accept an optical fiber and align the optical fiber with a location for coupling energy to a corresponding input of the first and second area array waveguide layer.

11. The stacked area array waveguide power splitter of claim 10, further comprising:
- a first plurality of alignment features that accepts a corresponding number of optical fibers for coupling energy from a corresponding number of outputs of the first area array waveguide layer; and
- a second plurality of alignment features that accepts a corresponding number of optical fibers for coupling energy from a corresponding number of outputs of the second area array waveguide layer.

12. The stacked area array waveguide power splitter of claim 9, wherein the locations for coupling energy from the first plurality of outputs and the locations for coupling energy from the second plurality of outputs is a diffuse surface.

13. The stacked area array waveguide power splitter of claim 9, wherein the reflective layer of the first area array waveguide layer and the reflective layer of the second area array waveguide layer include a material having a substantially lower index of refraction than material that forms a core of the first and second area array waveguide layers.

* * * * *

UNITED STATES PATENT AND TRADEMARK OFFICE
CERTIFICATE OF CORRECTION

| | |
|---|---|
| PATENT NO. | : 9,052,462 B2 |
| APPLICATION NO. | : 13/698933 |
| DATED | : June 9, 2015 |
| INVENTOR(S) | : Terrel Morris et al. |

It is certified that error appears in the above-identified patent and that said Letters Patent is hereby corrected as shown below:

In the claims

In column 6, line 33, in Claim 1, delete "wavequide" and insert -- waveguide --, therefor.

In column 7, line 22, in Claim 9, delete "wavequide" and insert -- waveguide --, therefor.

Signed and Sealed this
Eighth Day of December, 2015

Michelle K. Lee
*Director of the United States Patent and Trademark Office*